(12) United States Patent
Kim

(10) Patent No.: US 6,698,823 B2
(45) Date of Patent: Mar. 2, 2004

(54) FRONT PILLAR PANEL ASSEMBLY STRUCTURE OF A VEHICLE

(75) Inventor: Sang-Up Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/326,015

(22) Filed: Dec. 18, 2002

(65) Prior Publication Data

US 2003/0146649 A1 Aug. 7, 2003

(30) Foreign Application Priority Data

Feb. 6, 2002 (KR) .......................................... 2002-6710

(51) Int. Cl.⁷ .................................................. B60J 7/00
(52) U.S. Cl. ............................ 296/203.03; 296/203.01; 296/203.02
(58) Field of Search ........................ 296/203.03, 193.06, 296/187.12, 146.6, 146.9, 202, 30, 185

(56) References Cited

U.S. PATENT DOCUMENTS

| | | | | |
|---|---|---|---|---|
| 4,252,364 A | * | 2/1981 | Toyama et al. .............. | 296/185 |
| 4,545,612 A | | 10/1985 | Harasaki | |
| 4,747,636 A | * | 5/1988 | Harasaki et al. ....... | 296/203.03 |
| 4,763,925 A | * | 8/1988 | Onoe et al. ................ | 296/30 |
| 5,042,872 A | | 8/1991 | Yoshii | |
| 5,586,799 A | * | 12/1996 | Kanemitsu et al. .... | 296/203.02 |
| 5,653,495 A | * | 8/1997 | Bovellan et al. ........ | 296/203.03 |
| 5,800,007 A | * | 9/1998 | Cho ........................ | 296/146.6 |
| 5,855,407 A | * | 1/1999 | Fukuda ................... | 296/203.03 |
| 5,992,925 A | | 11/1999 | Alberici | |
| 6,073,992 A | * | 6/2000 | Yamauchi et al. ..... | 296/203.01 |
| 6,179,372 B1 | | 1/2001 | Sakamoto et al. | |
| 6,217,109 B1 | * | 4/2001 | Okana et al. .......... | 296/203.03 |
| 6,254,172 B1 | * | 7/2001 | Takahara ............... | 296/203.03 |
| 6,276,477 B1 | | 8/2001 | Ida | |
| 6,322,124 B1 | | 11/2001 | Kim | |
| 6,322,134 B1 | * | 11/2001 | Yang ...................... | 296/203.03 |
| 6,474,726 B1 | * | 11/2002 | Hanakawa et al. .... | 296/203.03 |
| 6,478,366 B1 | * | 11/2002 | Cheong ................. | 296/203.03 |
| 6,554,350 B2 | * | 4/2003 | Takahara ............... | 296/203.03 |
| 2002/0033618 A1 | * | 3/2002 | Kwon .................... | 296/203.03 |
| 2002/0063444 A1 | * | 5/2002 | Kim ....................... | 296/203.03 |
| 2002/0190544 A1 | * | 12/2002 | Yamamoto et al. .... | 296/203.03 |
| 2003/0102695 A1 | * | 6/2003 | Kim ....................... | 296/203.03 |

FOREIGN PATENT DOCUMENTS

| | | | |
|---|---|---|---|
| JP | 62 103262 | * | 5/1987 |
| JP | 2000 108930 | * | 4/2000 |
| JP | 2001 301654 | * | 10/2001 |

* cited by examiner

*Primary Examiner*—Kiran Patel
(74) *Attorney, Agent, or Firm*—Morgan Lewis & Bockius LLP

(57) ABSTRACT

The present invention discloses a front pillar panel assembly for a vehicle. The front pillar panel assembly includes a side inner panel and a side outer panel, welded together so as to form a closed box-shape in cross-section. A side outer reinforcing panel and a door upper mounting panel are welded together and added along an inner surface of the side inner panel in a sequential manner. An outer bracket is coupled along the inside face of the side inner panel, with both ends welded to the door upper mounting panel. Furthermore, a door upper mounting reinforcing bracket is included and welded along the inner surface of the door upper mounting panel.

4 Claims, 3 Drawing Sheets

FRONT PILLAR PANEL ASSEMBLY STRUCTURE OF A VEHICLE

FIELD OF THE INVENTION

The present invention relates to a front pillar panel assembly for a vehicle. More particularly, the present invention relates to a reinforcing structure for a front pillar panel assembly for a vehicle that minimizes the body of the vehicle from encroaching on the occupant space in the event of an offset collision.

BACKGROUND OF THE INVENTION

In a conventional vehicle, a pillar panel supports the side portions of the door and the roof panel. Typical pillar panels include a front pillar panel, a center pillar panel and a rear pillar panel, relative to the front, center, and rear of the car. The front pillar panel assembly supports the front door and includes a side inner panel and a side outer panel welded to the side inner panel. This forms a closed box-shaped cross-section. Further included is a side outer reinforcing panel welded along the inner surface of the side outer panel. A door upper mounting panel is welded along the side outer reinforcing panel and has one end welded onto the inner surface of the side inner panel across the box closed cross-section. Finally, an outer bracket is added along the side inner panel with both ends separated from the side inner panel and welded to the door upper mounting panel. In this conventional front pillar panel assembly, the outer reinforcing bracket is positioned closer to the side inner panel rather than the side outer panel.

A drawback of this design is that the side outer panel is weaker than the side inner panel. This results in the side outer panel being pushed into the vehicle interior during a direct offset collision, thereby potentially severely endangering the occupants of the vehicle.

SUMMARY OF THE INVENTION

The present invention provides a reinforced front pillar panel assembly for a vehicle. A door upper mounting reinforcing bracket is added along the inner surface of a door upper mounting panel. This improves the rigidity of a side outer panel of the vehicle. Thus, encroachment of the body into the occupant compartment is reduced during a direct offset collision. The overall biasing of the front pillar panel assembly toward the interior of the vehicle is reduced, thereby reducing adverse effects on the opening and closing functions of the vehicle door.

In accordance with an embodiment of the present invention, a front pillar panel assembly structure of a vehicle includes a side inner panel and a side outer panel welded together so as to form a closed box-shape in cross-section. A side outer reinforcing panel and a door upper mounting panel are welded together and added along the inner surface of the side inner panel. An outer bracket is added along the inner surface of the side inner panel and both ends are welded to the door upper mounting panel. Finally, a door upper mounting reinforcing bracket is included along the inner surface of the door upper mounting panel.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
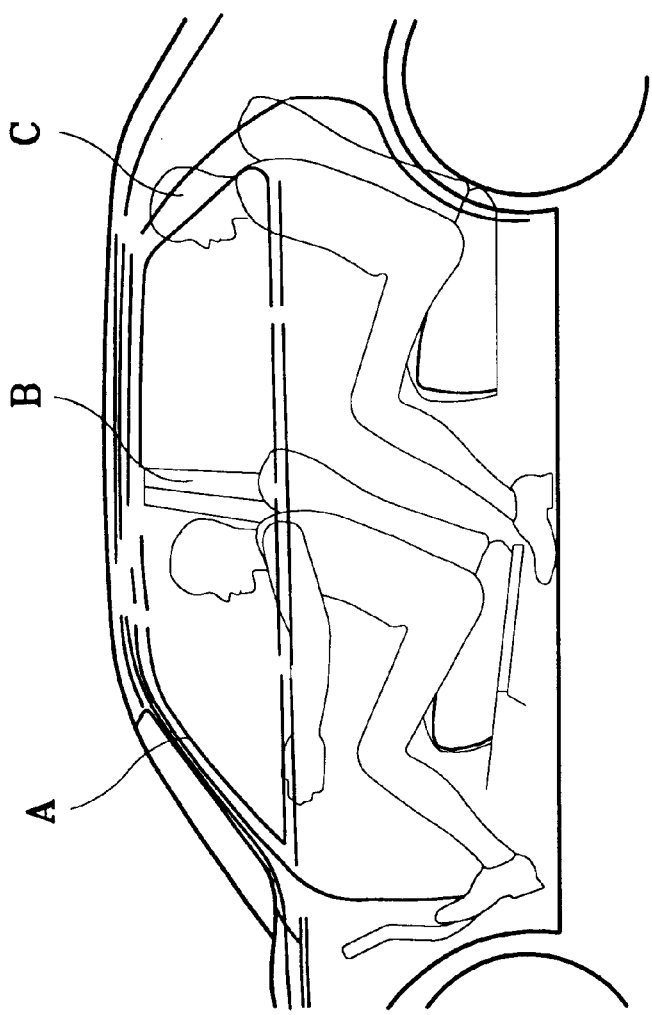
FIG. 1 is a side view of a vehicle.
Figure 2:
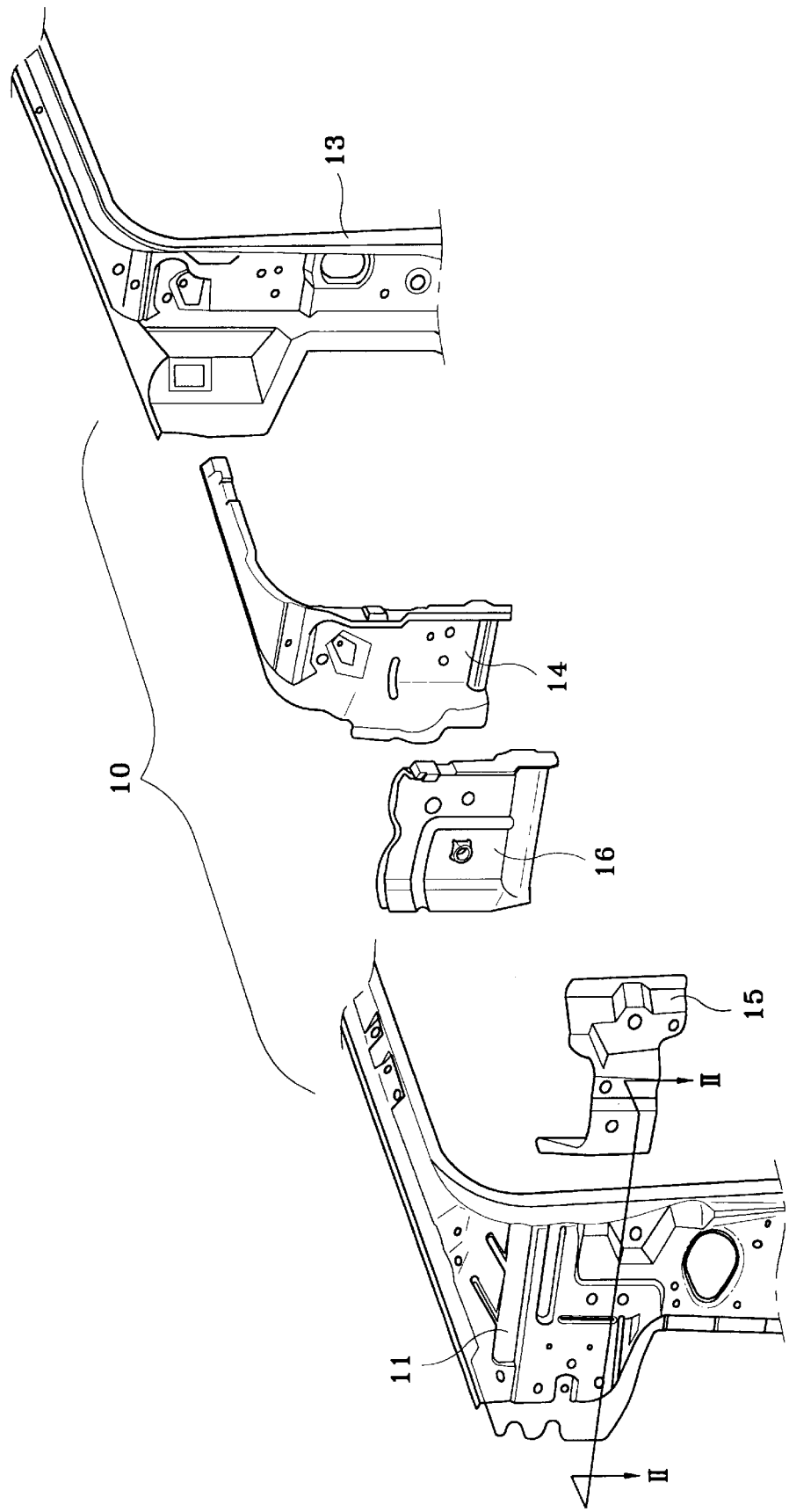
FIG. 2 is an exploded perspective view of an embodiment of the front pillar panel assembly according to an embodiment of the present invention.
Figure 3:
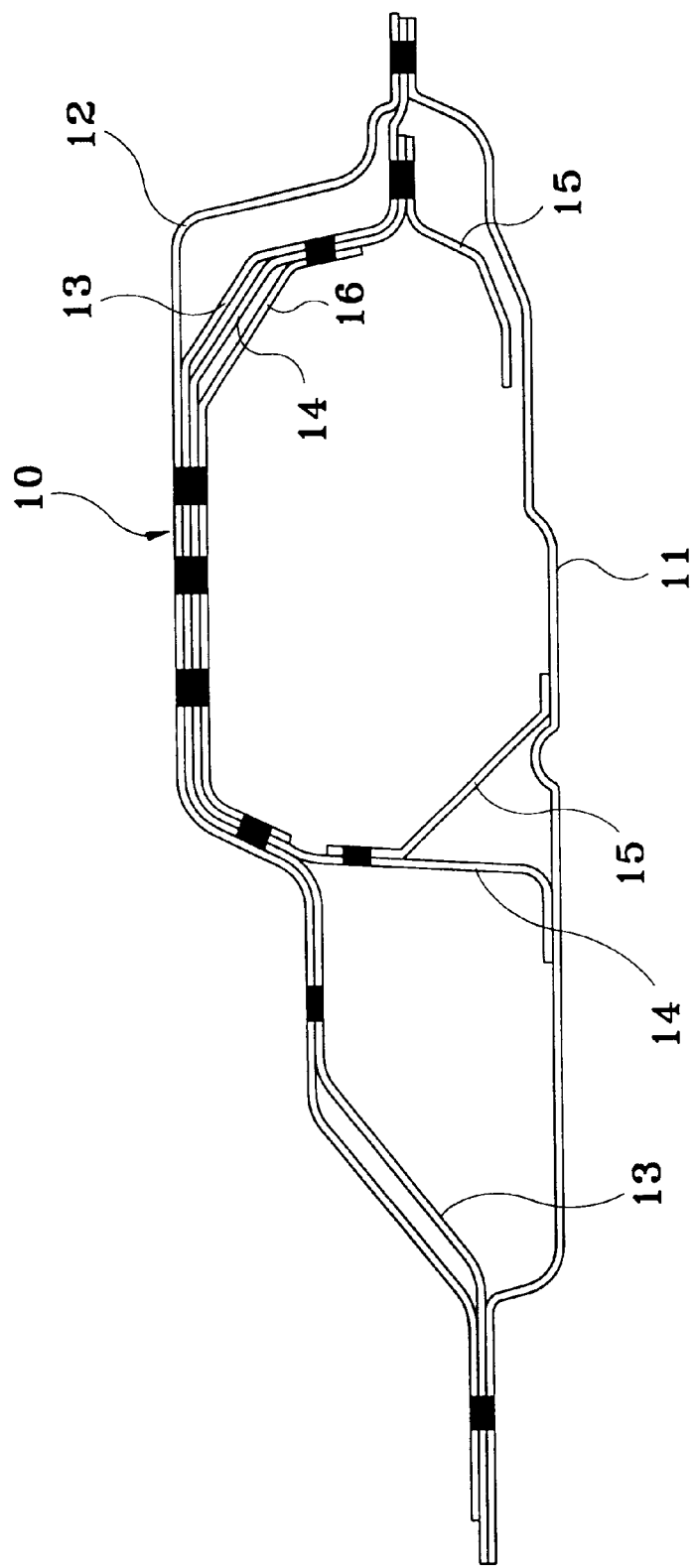
FIG. 3 is a partial sectional view taken along line II-II of FIG. 2.

FIG. 1 shows a side view of a vehicle having three side pillars, a front pillar A, a center pillar B, and a rear pillar C, respectively. FIGS. 2 and 3 show an embodiment of the front pillar according to an embodiment of the present invention. According to FIGS. 2 and 3, an embodiment of a front pillar panel assembly 10 of a vehicle, according to the invention includes a side inner panel 11 having a curved shape and being disposed toward the vehicle interior. A side outer panel 12 is welded to the side inner panel 11 to form a closed box-shaped cross-section. A side outer reinforcing panel 13 added along the inner surface of the side outer panel 12. The side outer reinforcing panel 13 is welded to the side inner panel 11 and the side outer panel 12 at both locations that form the closed box-shape between the side inner panel 11 and the side outer reinforcing panel 12. A door upper mounting panel 14 is included along an inner surface of the side outer reinforcing panel 13. One end of the upper mounting panel 14 is welded to the inner surface of the side inner panel 11 across from the closed box-shape cross-section. An outer bracket 15 is added along an inner surface of the side inner panel 11 and both ends are welded to the door upper mounting panel 14. Also, a door upper mounting reinforcing bracket 16 is added along an inner surface of the door upper mounting panel 14. The door upper mounting reinforcing bracket 16 is then welded to the inner surface of the door upper mounting panel 14.

One end of the door upper mounting reinforcing bracket 16 is bent, such that it vertically divides the space formed between the side inner panel 11 and the side outer panel 12. The door upper mounting reinforcing bracket 16 is welded to the inner surface of the door upper mounting panel 14.

In use, when the door upper mounting reinforcing bracket 16 is coupled on a bias toward the side outer panel 12 relative to the outer bracket 15, the force acting on the space formed between the side inner panel 11 and the side outer panel 12 is distributed toward the side inner panel 11 and the side outer panel 12. This forms an equilibrium of force distribution within the front pillar structure, thereby reducing its displacement into the occupant compartment of the vehicle.

The foregoing description of embodiments of the present invention are presented for purposes of illustration and description, not limitation. The embodiments described are not intended to be exhaustive or to limit the invention to the embodiments disclosed. Many modifications are possible from the above disclosed teachings. The above disclosure is intended to enable others skilled in the art to best utilize the invention and the various embodiments with various modifications. It is intended that the scope of the invention be defined by the following claims and their equivalents.

What is claimed is:

1. A front pillar panel assembly for a vehicle, comprising:
   a side inner panel and a side outer panel welded together so as to form a closed box-shape in cross-section;
   a side outer reinforcing panel and a door upper mounting panel welded together and coupled along an inner surface of the side outer panel in a sequential manner;

an outer bracket coupled along an inner surface of the side inner panel, with both ends of the outer bracket welded to the door upper mounting panel; and a door upper mounting reinforcing bracket coupled and welded along an inner surface of the door upper mounting panel.

2. The assembly of claim 1, wherein one end of the door upper mounting reinforcing bracket is bent so as to vertically divide a space formed between the side inner panel and the side outer panel, and is coupled to the inner surface of the door upper mounting panel.

3. A front pillar panel assembly for a vehicle, comprising:

a side outer panel having two opposing edges and an inner surface;

a side inner panel coupled along two opposing edges with said two opposing edges of said side outer panel wherein said coupled side inner panel and said side outer panel form a closed box in cross section;

a side outer reinforcing panel coupled within the closed box with the inner surface of said side outer panel wherein said side outer reinforcing panel is further coupled within said side inner panel and said side outer panel couplings;

a door upper mounting panel coupled with said side outer reinforcing panel toward the interior of the closed box;

an outer bracket coupled toward the interior of the closed box and along said side inner panel wherein said outer bracket is coupled along two opposing edges with said door upper mounting panel; and a door upper mounting reinforcing bracket coupled with an inner side of said door upper mounting panel.

4. The assembly of claim 3, wherein said door upper mounting reinforcing bracket is configured to divide the closed box interior into two sections.

\* \* \* \* \*